United States Patent
Maxson et al.

(10) Patent No.: US 8,154,303 B2
(45) Date of Patent: Apr. 10, 2012

(54) METHOD FOR LOCATING CABLE IMPAIRMENTS

(76) Inventors: Ben Maxson, Beech Grove, IN (US); Daniel K. Chappell, Greenwood, IN (US)

( * ) Notice: Subject to any disclaimer, the term of this patent is extended or adjusted under 35 U.S.C. 154(b) by 804 days.

(21) Appl. No.: 12/249,494

(22) Filed: Oct. 10, 2008

(65) Prior Publication Data

US 2009/0096665 A1   Apr. 16, 2009

Related U.S. Application Data

(60) Provisional application No. 60/978,868, filed on Oct. 10, 2007.

(51) Int. Cl.
*G01R 31/08* (2006.01)
*G01R 31/02* (2006.01)
*G01R 31/28* (2006.01)
*H04N 17/00* (2006.01)

(52) U.S. Cl. ........ 324/532; 324/528; 324/531; 324/535; 324/543; 348/192; 725/107

(58) Field of Classification Search .................. 324/512, 324/522, 523, 527, 528, 531, 532, 535, 543; 342/357.22, 357.25, 357.39, 357.51, 357.52, 342/357.58; 725/107; 348/192
See application file for complete search history.

(56) References Cited

U.S. PATENT DOCUMENTS

| | | | | |
|---|---|---|---|---|
| 4,818,990 A * | 4/1989 | Fernandes | ................ | 340/870.07 |
| 5,294,937 A * | 3/1994 | Ostteen et al. | ........... | 342/357.31 |
| 5,777,662 A * | 7/1998 | Zimmerman | ................ | 725/107 |
| 6,005,518 A * | 12/1999 | Kallina | ......................... | 324/527 |
| 6,313,874 B1 * | 11/2001 | Bowyer et al. | .................. | 324/95 |
| 6,801,162 B1 * | 10/2004 | Eckenroth et al. | ............ | 342/418 |
| 6,833,859 B1 * | 12/2004 | Schneider et al. | ............ | 348/192 |
| 6,978,476 B2 * | 12/2005 | Zimmerman | ................ | 725/107 |
| 7,360,124 B2 * | 4/2008 | Bouchard | .................... | 714/47.3 |
| 7,489,137 B2 * | 2/2009 | Williams | ..................... | 324/527 |
| 7,548,201 B2 * | 6/2009 | Eckenroth et al. | ............ | 725/107 |
| 7,692,538 B2 * | 4/2010 | Schweitzer et al. | .......... | 324/522 |
| 7,945,939 B2 * | 5/2011 | Eckenroth et al. | ............ | 324/512 |
| 2004/0012520 A1 | 1/2004 | Talbot et al. | ............ | 342/357.08 |
| 2006/0248565 A1 * | 11/2006 | Shimp et al. | .................. | 725/123 |
| 2008/0033698 A1 * | 2/2008 | Stelle | ............................ | 702/189 |
| 2008/0133308 A1 * | 6/2008 | Harris | ................................ | 705/9 |

* cited by examiner

*Primary Examiner* — Timothy J Dole (74) *Attorney, Agent, or Firm* — Matthew A. Pequignot; Pequignot + Myers LLC (57) ABSTRACT

Methods are disclosed for identifying and locating points of impairment in a cable plant, such as that used for cable television (CATV). The methods utilize both known characteristics of signals as well as propagation times in free space and within the cable in conjunction with accurate determination of locations at which measurements are taken. The methods can be applied to both RF cable leaks as well as points of ingress of interference.

19 Claims, 6 Drawing Sheets

METHOD FOR LOCATING CABLE IMPAIRMENTS

CROSS-REFERENCE TO RELATED APPLICATIONS

The present invention claims priority from U.S. Provisional Patent Application No. 60/978,868 filed Oct. 10, 2007, which is incorporated herein by reference.

TECHNICAL FIELD

The present invention is directed to detection and location of impairments in a cable plant for cable television (CATV) systems, and more particularly, to propagation time, signal strength and tone ranging techniques for locating such impairments.

BACKGROUND OF THE INVENTION

Because the cable television (CATV) network shares frequencies with licensed radio frequency (RF) services, care must be taken to prevent signal leakage from the cable plant degrading licensed services, and to prevent signal ingress from licensed services degrading signals on the cable plant.

Ingress is most problematic in the 5-43 MHz spectrum used for upstream (return path) transmission, i.e. from the customer to the head end. Common sources of ingress signals include amateur radio, remote controls for RC toys, AM broadcast, shortwave broadcast, and transients from consumer electronics.

On the other hand, the Federal Communications Commission (FCC) requires that leakage from the CATV plant be tightly controlled to minimize interference to other services, particularly the aviation band around 110-140 MHz.

Currently, specialized scanning spectrum analyzer equipment is used at the head end or node to monitor the return path of each node for the presence and strength of ingress or interference and to create or store alarms when interference takes place. When a sufficiently harmful interferer is detected, personnel are dispatched to identify and address the physical point of entry of the interference, be it a loose connector, broken shield, home wiring, etc. Existing monitoring equipment identifies only the node where ingress is occurring; the physical point of ingress is pinpointed by systematically segmenting the network to isolate the source.

Ingress troubleshooting is performed manually by repeatedly segmenting the network. For instance, a time-based technique is used by Arcom's Hunter to find control point discovery (CPD), based (presumably) on cross-correlation between the downstream and upstream channels, but there does not appear to be any timing-based ingress detection or transmit-based ingress technology in the market to date.

For detecting signal leakage out of the CATV plant radiating into free space, signal-strength detection techniques are currently used, perhaps in combination with triangulation using a directional antenna element, to track the leakage to its source.

The radiating leaked signal strength can vary with time, rendering a series of measurements taken at various locations over extended time periods unreliable. Both directional antenna and signal strength measurements are vulnerable to interference from other signal sources in the same frequency range. Furthermore signal leakage from cable plant may not occur uniformly in all directions, rendering the signal strength measurements difficult to interpret, or even totally unusable in the worst case.

Some leakage detection equipment contains GPS modules, but they are used for meter positioning only. Talbot et al. (US Patent Application 20040012520) describes the use of the highly precise cesium-rubidium clocks in orbiting navigation satellite systems such as the global positioning system (GPS) as standards for calibrating electronic distance meters (EDM). Baseline measurements made by the EDM are therefore not subject to mis-calibrations and drift as long as the satellite navigation receiver is locked onto and tracking the navigation satellites.

So, while the locations where leakage detection measurements are taken can be determined with adequate accuracy, none of the prior art techniques attempt to identify the leaked signal by its content or otherwise exclude from consideration extraneous signal sources.

An object of instant invention is to provide a method for locating cable plant faults using the characteristics of one or more signals in conjunction with their total propagation time through cable plant and free-space.

SUMMARY OF THE INVENTION

A method is disclosed for locating an impairment in a cable plant comprising transmitting a test signal having a known characteristic between a test node in the cable plant and a selected test point at a physical location outside the cable plant via the impairment, measuring a total propagation time of the test signal between the test node and the test point, and estimating from the total propagation time a maximum impairment distance in the cable plant between the impairment and the test node.

In another aspect of the invention, a method is disclosed for locating an impairment in a cable plant comprising transmitting a test signal having at least one frequency between a test node in the cable plant and a test point via the impairment, moving the test point along a test heading in relation to the cable plant, measuring a Doppler frequency shift of at least one of the frequencies of the test signal, estimating a heading error to the impairment from the Doppler frequency shift and a velocity of the test point and selecting a new test heading from the estimated heading error.

BRIEF DESCRIPTION OF THE DRAWINGS

The invention will be described in greater detail with reference to the accompanying drawings which represent preferred embodiments thereof, wherein.

DETAILED DESCRIPTION

It is an object of instant invention provide a method for locating cable plant faults, which become apparent from either signals in the cable plant leaking out and radiating into free space or from entry of interfering signals from free space into the cable plant, also known as ingress.

The method is based on the principle that total signal propagation times includes two components under these circumstances. The propagation time through the cable plant to a leak or point of ingress or interference is, by its nature, fixed whereas the propagation time in free space can be varied according to different locations of a testing meter or a signal source.

Using the characteristics of one or more signals used in the measurements of propagation time, the total propagation time through the cable plant and free-space can be identified and differentiated from other signal sources in close physical or frequency range proximity. From measurements at different physical locations with correspondingly different free-space propagation times the propagation time within the cable plant and consequently the physical location of a fault can be determined with improved reliability. Measured characteristics of the ingress and radiated signals may include timing, frequency, level, message contents or their combination.

Clearly, the total propagation time method can be applied equivalently to signals emanating or leaking out of, as well as entering or ingressing into the cable plant.

In one variant of the method for locating faults which involve signals leaking out of the cable plant such as a CATV system and radiating into free space, timing measurements are performed at several locations in free space on RF signals leaking from the fault. The timing measurements may be performed in the time domain or in the frequency domain, as will be elaborated below.

Figure 1:
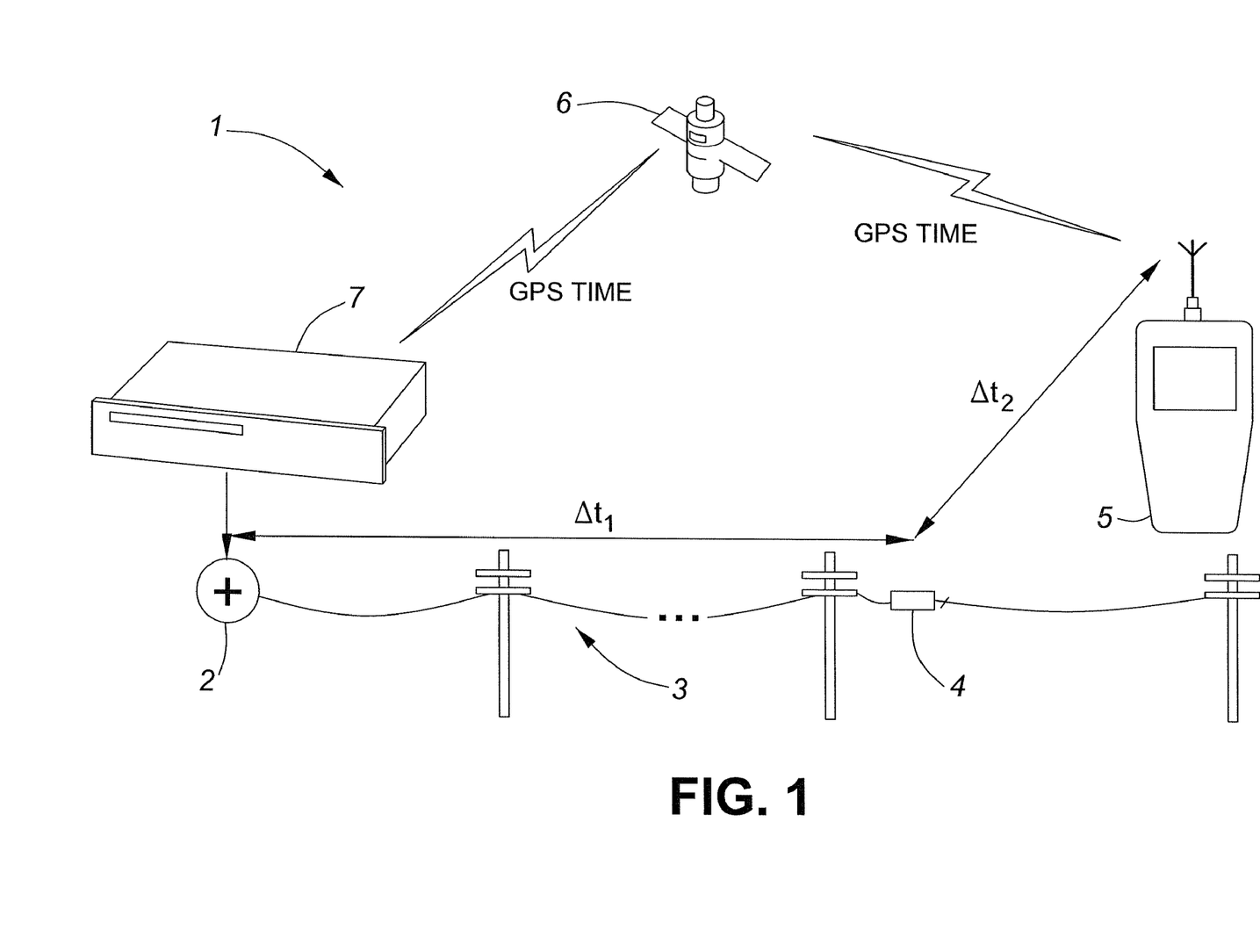
FIG. 1 is a diagram of a CATV system leakage detection scheme according to the present invention employing time standards from a satellite positioning and mobile test meter.

As shown in FIG. 1, a CATV system 1 comprises a head-end 2 connected to cable plant 3 for transmitting signals, such as TV, internet or similar, to consumers located some distance away. A fault in the cable plant 3 can give rise to a signal leak 4 at a location some unknown distance from the head-end 2. The signal leak 4 radiates the transmitted signals into free space, not necessarily with uniform signal strength in all directions.

The purpose of a mobile receiving device, such as a testing meter 5 is to estimate its distance from a source of the signal leak 4 in the cable plant 3. The mobile testing meter 5 makes use of one or more parameters to perform the estimate.

Primarily, testing meter 5 receives and detects the leaked signal from the signal leak 4.

Secondly, the testing meter 5 can be equipped to identify the leaked signal by its characteristics either by comparing it to previously stored data in its memory or storing the received signal characteristics for later comparison with data archived at the head-end 2 or some other convenient location.

Thirdly, the testing meter 5 can register its geographic location from a suitable positioning system such as an orbiting navigation satellite system 6 known as the global positioning system (GPS).

Fourthly, the received leaked signal from the signal leak 4 can be time-stamped with its time of arrival at the testing meter 5. Since this needs to be done precisely, a reliable time reference is required. The highly precise cesium-rubidium clocks in the orbiting navigation satellite GPS system 6 can be effectively used for this purpose.

With information about the characteristics of signal (s) present on the cable plant 3 at a given time, the testing meter 5 will monitor its antenna's received signal for the presence of those characteristics and will record the time $t_1$ at which they were observed.

The signal characteristics could be provided a priori if known, e.g. a test pattern, phase-locked TV carriers, etc., either by existing equipment, e.g. time-synchronized broadcast modulators, or injected at the head-end 2 by a secondary device 7, e.g. a time-synchronized leakage tagger.

Equipment at the head-end 2, e.g. a transmitter, inserts a signal on the cable plant 3 at time $t_0$. Time $t_1$, which is the time when the signal is detected by the testing meter 5, is given by:

$$t_1 = t_0 + \Delta t_1 + \Delta t_2 \qquad \text{Equation (1)}$$

The time for the signal to travel from the head-end 2 through the cable plant 3 to the signal leak 4 at a velocity of propagation $V_{P1}$ is $\Delta t_1$. The time that the signal radiates through free space, after leaking through the cable, at a velocity of propagation $V_{P0} = 3 \times 10^8$ m/s is designated by $\Delta t_2$. Given the signal insertion time $t_0$, the total change in time is $$\Delta t_{total} = t_1 - t_0 = \Delta t_1 + \Delta t_2 \qquad \text{Equation (2)}$$

Because the fraction of the signal trip in the cable versus in free space is not known, the distance from the signal leak 4 to the testing meter 5, or from the head-end 2 to the signal leak 4, cannot be computed directly. However, upper and lower bounds on the distance from testing meter 5 to head-end 2, $D_{max1}$ and $D_{min1}$ respectively, can be computed according to equations 3a and 3b:

$$D_{max1} = \Delta t_{total} * V_{P0} \qquad \text{Equation (3a)}$$

$$D_{min1} = \Delta t_{total} * V_{P1} \qquad \text{Equation (3b)}$$

One of the upper and lower bounds, e.g. the upper bound, can be chosen for use as a first estimate, $D_{est1}$.

Subsequent measurements are taken in identical fashion, but from different meter locations to obtain additional distance estimates $D_{est2}, D_{est3}, \ldots D_{estN}$.

The results can be reported in several ways to the user:
1. Explicit, continuous display of the most recent distance estimate $D_{estN}$;
2. A difference between the most recent and previous distance estimates, which would provide a "warmer/colder" indication of motion toward or away from the signal leak 4;
3. Time-averaged versions of either of the above;
4. A graphical display of distance estimates as circles centered at the measurement position; or
5. With a sufficient number of measurements, N, a latitude/longitude intersection point could be hypothesized that best explains all the measurement results.

There may be preexisting time-synchronized or synchronizeable infrastructure signals on the cable plant 3, such as a DOCSIS timing server or an edge modulator, in which case there would be no need to inject a new signal.

If a position, D, of the signal leak 4 is suspected, the distances between the head-end 2 and the signal leak 4, and between the signal leak 4 and the testing meter 5 can be entered into the testing meter 5 via a user interface. When combined with the velocities $V_{P0}$ and $V_{P1}$, the times $\Delta t_1$ and $\Delta t_2$ can be estimated from equations 4a and 4b, summed and compared to the measured $\Delta t_{total}$ to confirm or reject the suspected position.

$$\Delta t_1 = D/V_{P0} \qquad \text{Equation (4a)}$$

$$\Delta t_2 = D/V_{P1} \qquad \text{Equation (4b)}$$

In either case, the difference between the time the signals were observed or placed on the plant head-end 2 and the time they were received at the testing meter 5 can be measured, provided the clocks at both the head-end 2 and the test meter 5 are synchronized. This synchronization is accomplished using the highly precise cesium-rubidium clocks in a GPS system 6 providing a time reference, or any other method. One particularly useful signal waveform for delay estimation is the instantaneous phase angle of TV carriers in and near the aviation band.

Figure 2:
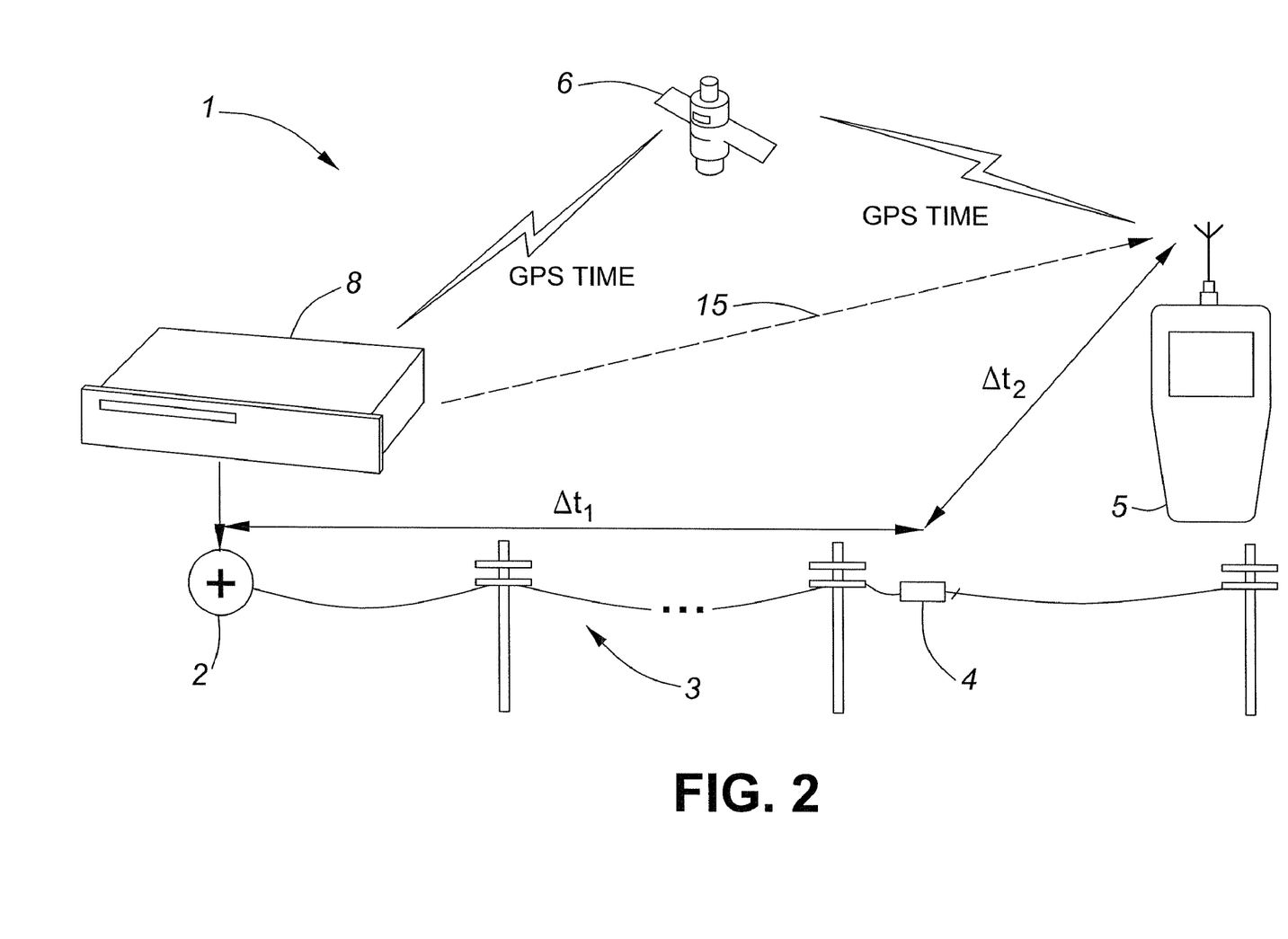
FIG. 2 is a diagram of an alternative arrangement of the present invention combining a satellite positioning with a communications path to a mobile test meter.

Alternatively, as illustrated in FIG. 2, the signals could be observed at a reference point by a secondary piece of time-synchronized equipment 8, e.g. back in a node or the head-end 2, which would then communicate the signal characteristics to the testing meter 5 in the field via another channel, e.g. a communication path 15, such as Data Over Cable Service Interface Specification (DOCSIS), Out-of-Band (OOB) and telemetry carrier, or stored for downloading offline at a later time.

Although wideband signals provide the greatest resolution and accuracy for time delay estimation, most of the energy in an analog TV signal is contained in its carrier. However, by using multiple carriers spaced across a wide bandwidth, the accuracy and range of a wideband measurement can be achieved. A variation on this narrowband technique is to estimate the velocity towards/away from the leak by measuring the frequency (rather than phase) of one or more TV carriers, rather than the distance to the leak.

Figure 3:
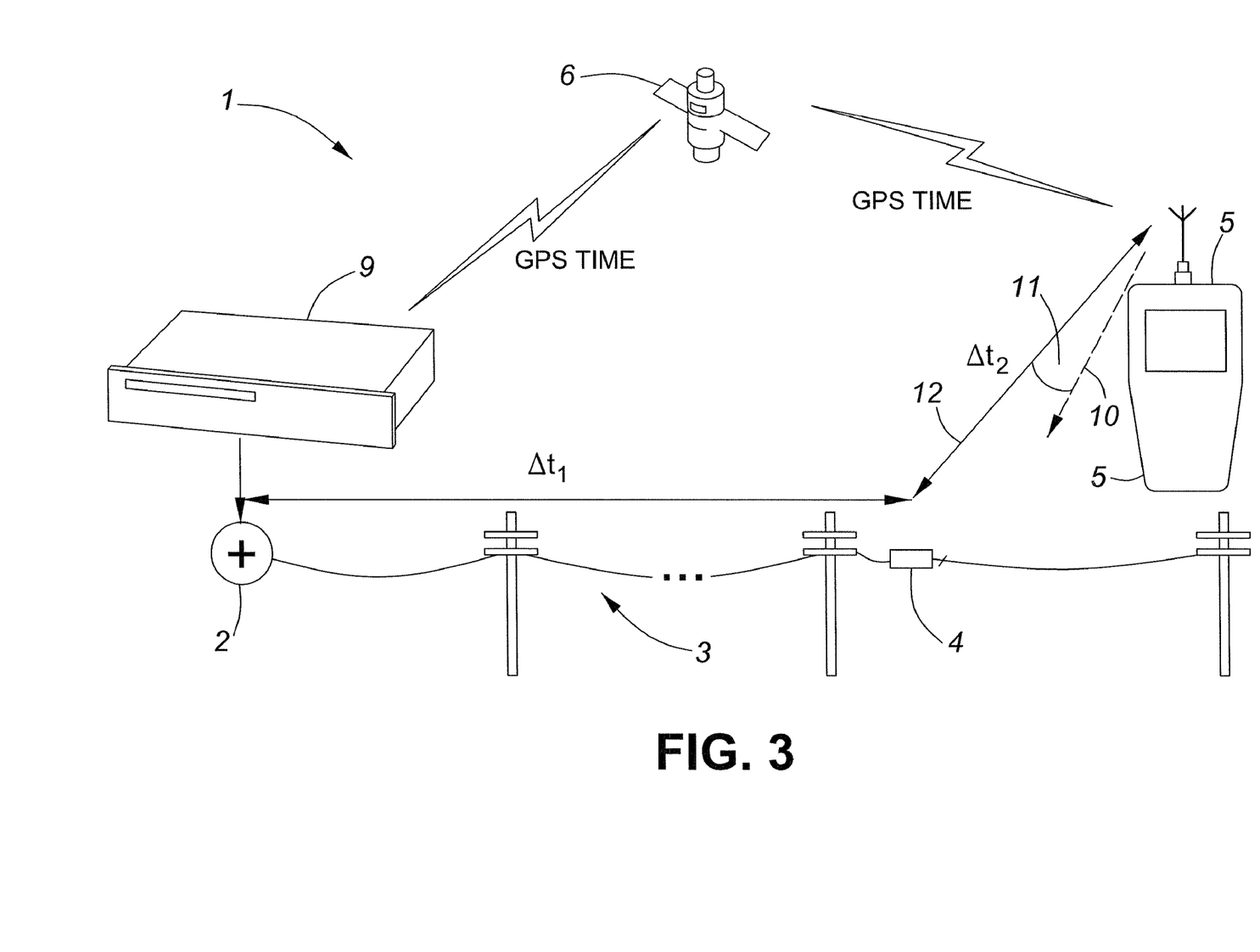
FIG. 3 is a diagram showing the use of Doppler frequency shift for fault location.

FIG. 3 shows an exemplary situation in which the rate of change of distance can be detected from a Doppler frequency shift. As above, the CATV system 1 comprises the head-end 2 through which signals are injected by a transmitter 9 into the cable plant 3 by for transmission to consumers at remote locations. The cable plant 3 has an impairment in the form of the signal leak 4 which causes some of the signal to leak out and radiate into free space. The testing meter 5 initially located from the signal leak 4 at a bearing 12 and a distance corresponding to free-space propagation time $\Delta t_2$ is moved by a technician or other means in some arbitrary direction of motion 10 at an angle referred to as a heading error 11.

Motion relative to the signal leak 4 containing a particular frequency, such as a TV carrier, produces an observed Doppler frequency shift, whose magnitude is proportional to the speed of testing meter 5 multiplied by the cosine of the heading error 11.

A positive Doppler frequency shift indicates motion toward the leak, while a negative Doppler frequency shift indicates motion away from the leak. Zero Doppler frequency shift indicates motion perpendicular to the bearing 12. Use of this Doppler method obviates the requirement for a disciplined clock (GPS or otherwise) at either the head-end 2 or the test meter 5, as oscillators with sufficiently stable and accurate frequency are readily available.

In addition to one or more narrowband signals, a wideband direct-sequence spread spectrum (DS-SS) signal can be injected onto the cable plant 3 and detected in the field with the testing meter 5. By using a long pseudo-noise (PN) spreading sequence, coding gain can be achieved to improve the detection performance of the technique.

As indicated earlier, propagation times can be determined using signals traveling in either direction. In addition to signal leakage out of the cable plant 3, cable faults 4 can be located by ingress of interfering signals into the cable plant 3. The time-of-arrival, frequency, signal strength, or contents of one or more ingress signals can be received and detected in order to estimate or aid the technician in estimating the physical location of a point of ingress. Ingress detection and location methods may have several variants.

Figure 4:
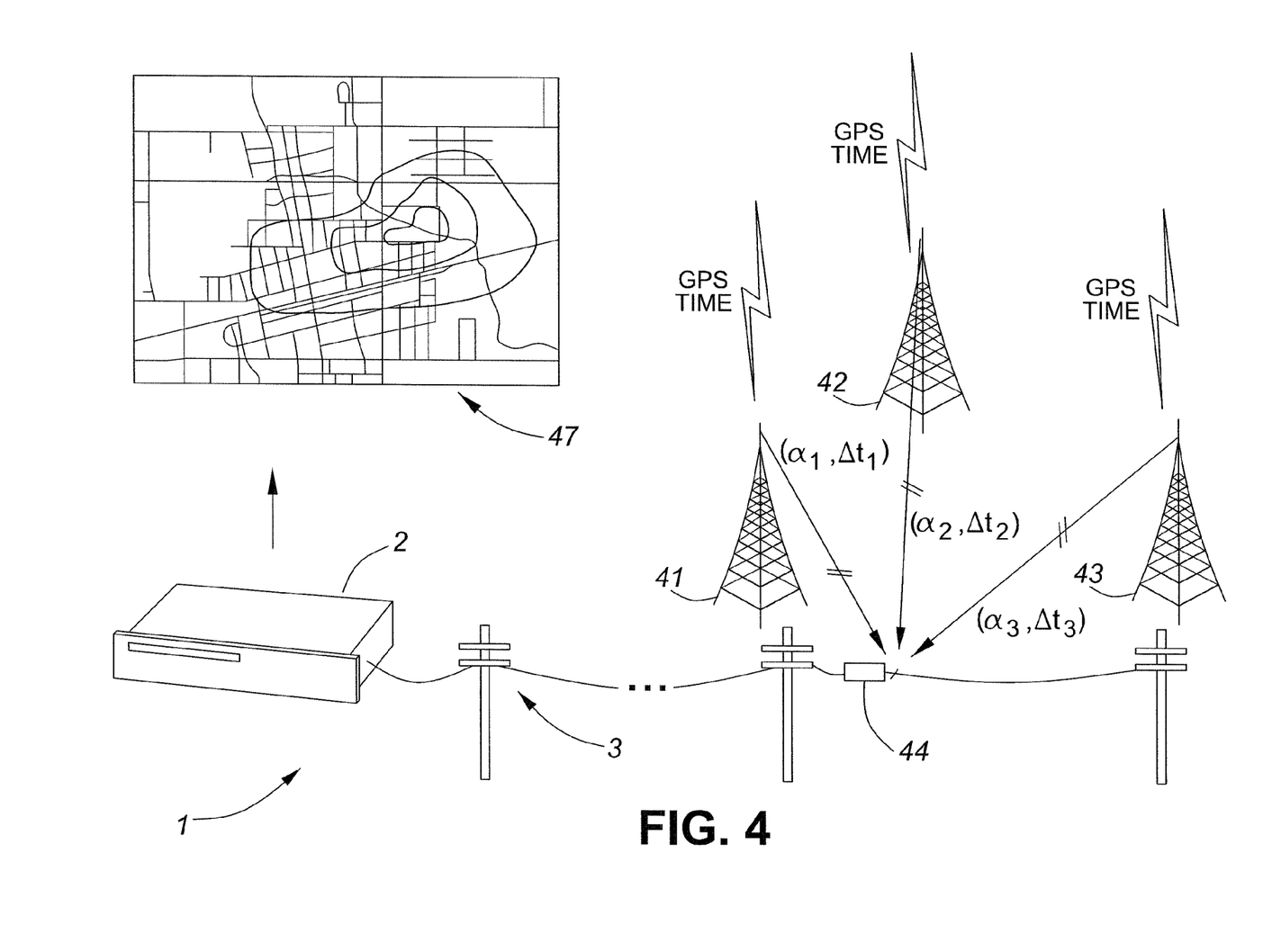
FIG. 4 is a diagram showing operation with non-cooperative emitters at known fixed positions where the time-of-transmission is known a priori due to traceability to a global time base.

A first variant is shown schematically in FIG. 4. The CATV system 1 comprises the head-end 2 which can receive signals from the cable plant 3. As an example, three non-cooperative emitters 41, 42, 43 with known fixed positions of transmission in receiving range of the cable plant 3 transmit signals with known a priori times of transmission. For instance the GPS can provide traceability to a global time base. The positions of transmission can also be estimated from RF measurements using conventional emitter positioning algorithms (RSS, TDOA, Doppler DOA, etc.)

The cable plant 3 has an impairment in the form of a point of ingress 44 through which some of the signal broadcast by synchronous non-cooperative emitters 41, 42, 43 enters from free space and into the cable plant 3. From the point of ingress 44 the signals propagate through the cable plant 3 at practically the same velocity arriving at the head-end 2 where their respective times of arrival is registered. Knowledge or estimate of the positions of transmission as well as the velocity of propagation in free space can then be applied to determine the respective propagation times $\Delta t_1$, $\Delta t_2$, $\Delta t_3$ corresponding to signals from emitters 41, 42, 43 respectively. Based on the measured times of arrival as well as the signal levels or strengths, $\alpha_1$, $\alpha_2$, $\alpha_1$, optionally in combination with a strand map 47, the potential points of ingress 44 can be identified.

Synchronous non-cooperative emitters or transmitters can also be synchronized to a universal time base such as radio/cellular synchronization to GPS time, or privately owned amateur equipment operated in a synchronized manner by agreement.

Figure 5:
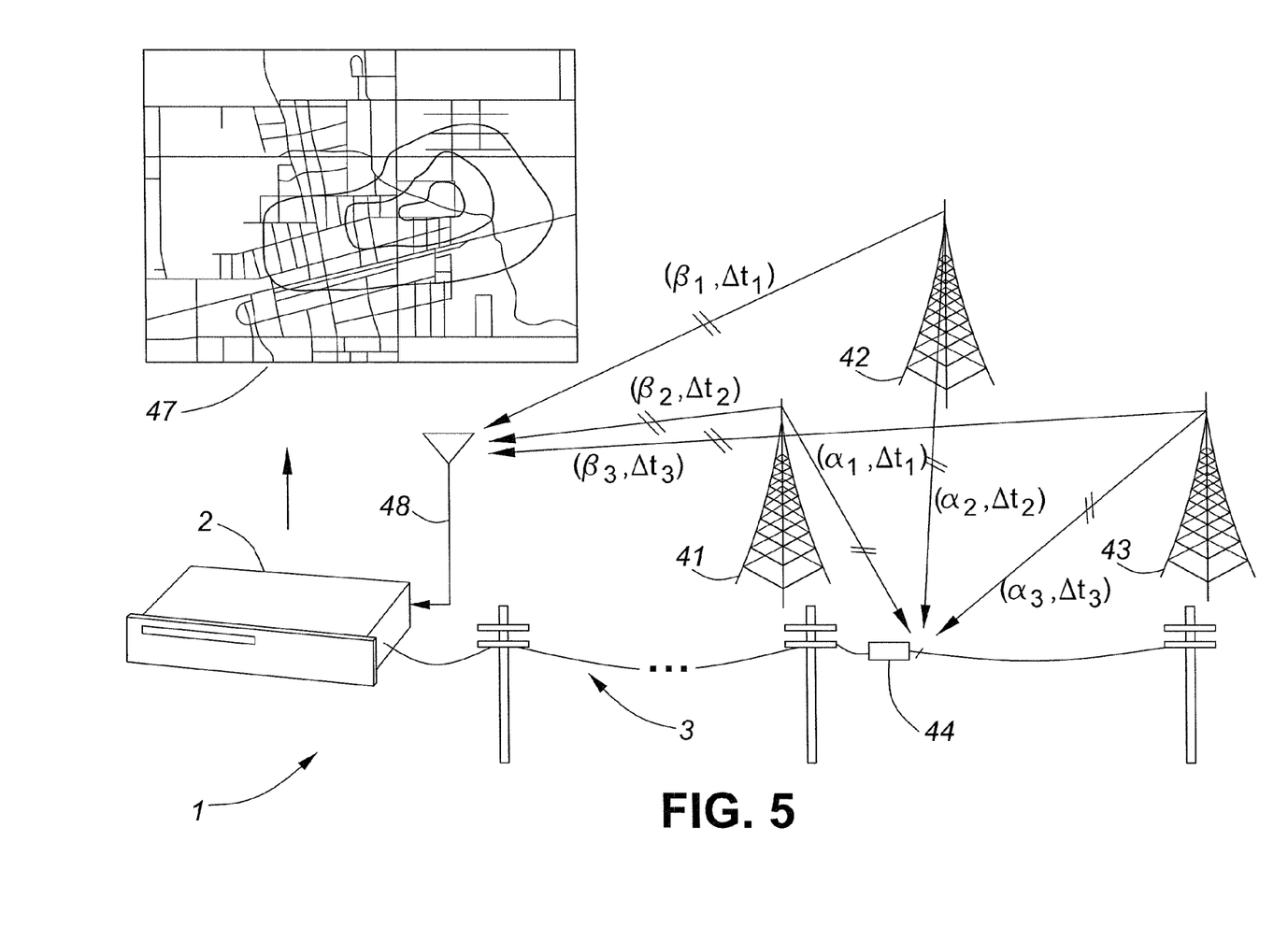
FIG. 5 is a diagram of non-cooperative emitters where the time-of-transmission is estimated by monitoring at a known supplementary fixed location.

Alternatively, for cases where the three non-cooperative emitters 41, 42, 43 have known fixed positions of transmission, but times of signal transmission are unknown, a variant can be used as described in FIG. 5. This differs from the previous example in that a supplementary receiver 48 is placed at a known location, advantageously at the head-end 2 or other convenient location for receiving the signals broadcast by emitters 41, 42, 43. Supplementary receiver 48 receives and detects the broadcast signals, registering their times of arrival so that the free space propagation times $\Delta \tau_1$, $\Delta \tau_2$, $\Delta \tau_3$ corresponding to signals from emitters 41, 42, 43 respectively can be deduced. In conjunction with the respective measured times of arrival via the cable plant 3, optionally in combination with a strand map 47, potential points of ingress 44 can be identified.

Figure 6:
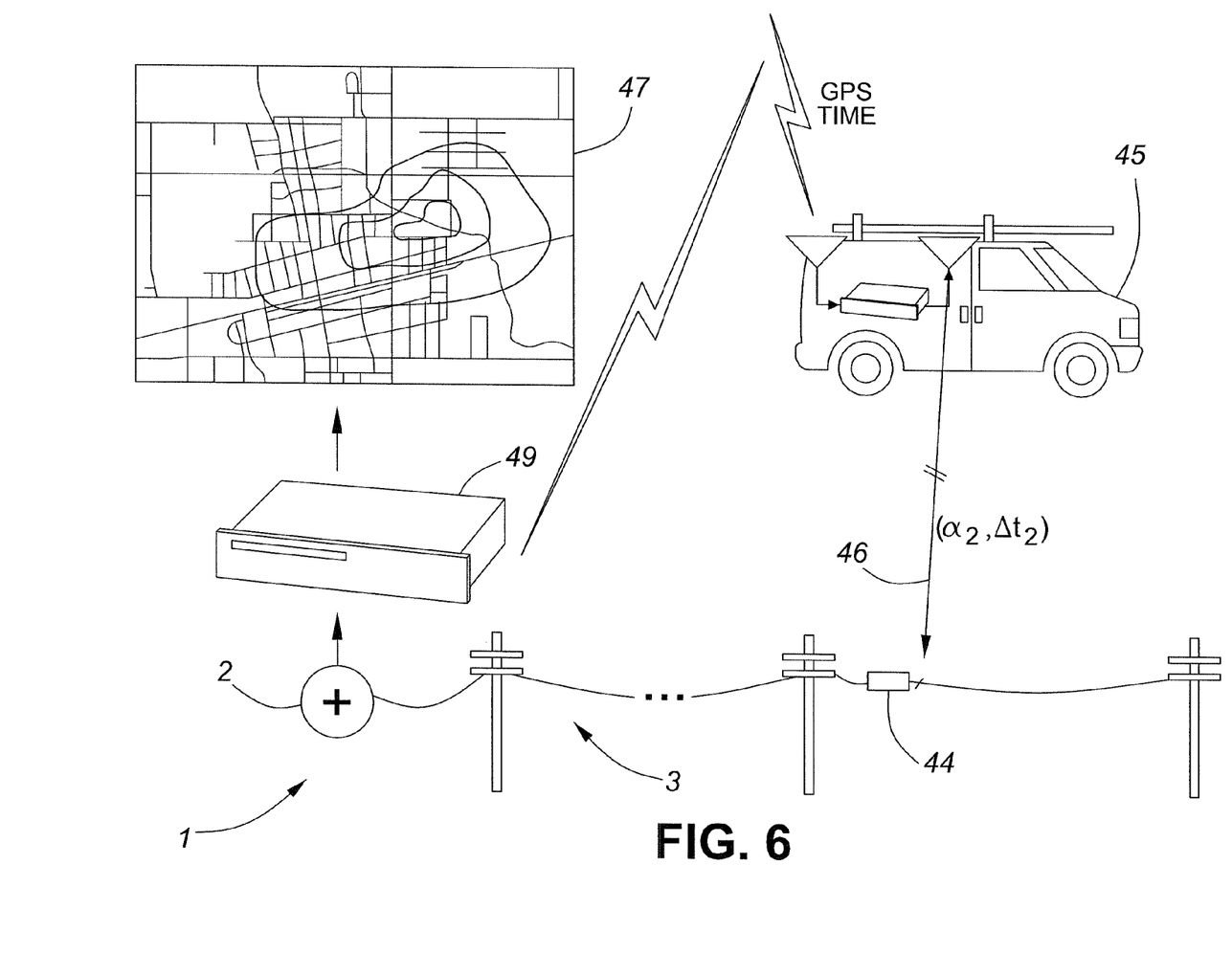
FIG. 6 is a diagram showing operation with a mobile cooperative emitter where time-of-transmission is controlled and position is measured and communicated to the ingress monitoring equipment. TDOA is used to triangulate the ingress position.

Instead of several transmitters at fixed known locations, a mobile cooperative transmitter 45 can be used permitting the choice of several suitable measurement locations, as shown in FIG. 6. The CATV system 1 is shown similar to that in the previous examples. The head-end 2, which can receive signals from the cable plant 3, and the point of ingress 44 are as before.

The mobile cooperative transmitter 45 emits signals with controlled time of transmission. The positions of transmission can be determined from field test equipment containing or co-located with a GPS receiver, or equipment placed at a fixed position measured by GPS, or any other suitable method. Synchronization of measurements of signal times of transmission and arrival between mobile cooperative transmitter 45 and ingress monitoring equipment 49 can be achieved with the GPS or synchronized oscillators of sufficient stability. From the deduced propagation times $\Delta t_2$, optionally in combination with a strand map 47, potential points of ingress 44 can be identified or estimated.

The transmitter positions can be transmitted back to the head-end 2 directly along a transmission path 46 via the point of ingress 44 and the cable plant 3 with the information carried on the transmitted signals themselves, or through a secondary communications channel (General Packet Radio Services (GPRS), WiFi wireless technology, etc.) or stored at the transmitter and post-processed. Time difference of arrival (TDOA) is used to triangulate the ingress position.

Alternatively, instead of signal time of arrival, the signal level or strength $\alpha_2$ can be used together with transmitter position for each location of measurement to identify, optionally in combination with a strand map 47, potential points of ingress 44.

An identified or estimated point of ingress or distance from ingress can also be communicated to a technician in the field either using the transmission path 46 via the point of ingress 44 or through a secondary communications channel, as listed above.

Transmission in the 27 MHz ISM band with an approximately 300 kHz bandwidth can be conveniently used, but other frequency ranges could be selected depending on local conditions. Using a spread spectrum signal in this band, significant coding gain can be achieved to improve detection performance and noise immunity.

Various types of signal can be used in the above methods, including unmodulated sinusoid (CW); direct-sequence spread spectrum (DS-SS), potentially containing data relaying the position of the transmitter; narrow-band; broad-band; multiple frequency and the like.

Signals may also be transmitted using an electronically or mechanically steered beam-forming/directional antenna mounted on a mobile unit such as a vehicle. The transmitting antenna is continuously swept in a substantially circular pattern so that the ensuing fluctuation in received signal strength can be used to separate the transmitted signal from other emitters at the same or nearby frequencies. This method could also be used to determine the heading to the point of ingress relative to the vehicle's orientation.

Similarly, a rotating antenna can be used to directionally receive or transmit test signals in order to differentiate them from other emitters at the same or similar frequencies.

We claim:

1. A method for locating an impairment in a cable plant comprising:
    a) transmitting a test signal having a known characteristic between a test node in the cable plant and a selected test point at a physical location outside the cable plant via the impairment;
    b) measuring a total propagation time of the test signal between the test node and the test point; and
    c) estimating from the total propagation time a maximum impairment distance in the cable plant between the impairment and the test node.

2. The method of claim 1, wherein the total propagation time in step b) is measured using timing from an orbiting navigation satellite positioning system.

3. The method of claim 1, wherein the physical location of the test point in step a) is measured using an orbiting navigation satellite positioning system.

4. The method of claim 1, further comprising transmitting the physical location of the test point to the test node via the impairment.

5. The method of claim 1, further comprising the step of using the known characteristic of the test signal to improve the total propagation time measurement accuracy.

6. The method of claim 5, wherein the known characteristic of the test signal is selected from the group including of a test pattern, a single phase-locked TV carrier, multiple phase-locked TV carriers, wide bandwidth direct-sequence spread spectrum with long pseudo-noise spreading sequence, and unmodulated CW.

7. The method of claim 1, further comprising the step of communicating the known signal characteristic from a transmission end to a receiving end over a separate communication path.

8. The method of claim 1, further comprising repeating steps a) to c) at least two times for different selected test points to determine a change in proximity to the impairment.

9. The method of claim 1, further comprising repeating steps a) to c) at least three times for different selected test points to directly estimate an impairment location.

10. The method of claim 9, further comprising using a known layout of the cable plant to improve estimates of the impairment location.

11. The method of claim 9, further comprising using a measured signal strength of a portion of the test signal received through the impairment to improve estimates of the impairment location.

12. The method of claim 9, further comprising the step of displaying on a display unit measurement results comprising at least one of an estimate of the maximum impairment distance, a difference between two most recent estimates of the impairment location, and a graphical display of estimates of the maximum impairment distances as circles centered at each test point.

13. The method of claim 9, wherein the impairment is a RF leak, and further comprising the step of measuring with a mobile receiver a time of arrival of the test signal from the test node in the cable plant at each test point.

14. The method of claim 9, wherein the impairment is a point of ingress, and further comprising the step of measuring a time of arrival of the test signal from each test point at the test node in the cable plant.

15. The method of claim 14, wherein a mobile transmitter is used for transmitting the test signal from each test point.

16. The method of claim 15, further comprising transmitting the estimated impairment location to the test point for providing position feedback to a technician in the field.

17. The method of claim 1, further comprising:
    d) moving the test point along a test heading in relation to the cable plant;
    e) measuring a Doppler frequency shift of at least one of the frequencies of the test signal;
    f) estimating a heading error to the impairment from the Doppler frequency shift and a velocity of the test point;
    g) selecting a new test heading from the estimated heading error; and
    h) repeating steps d) to g).

18. The method of claim 17, wherein the impairment is a RF leak, and further comprising the step of receiving the test signal at the test point from the test node in the cable plant.

19. The method of claim 17, wherein the impairment is a point of ingress, and further comprising the step of receiving the test signal at the test node in the cable plant from the test point.

* * * * *